June 19, 1951  LA VERN A. CAMPBELL  2,557,339
DETACHABLE CAB
Filed June 13, 1950  2 Sheets-Sheet 1
FIG. 1
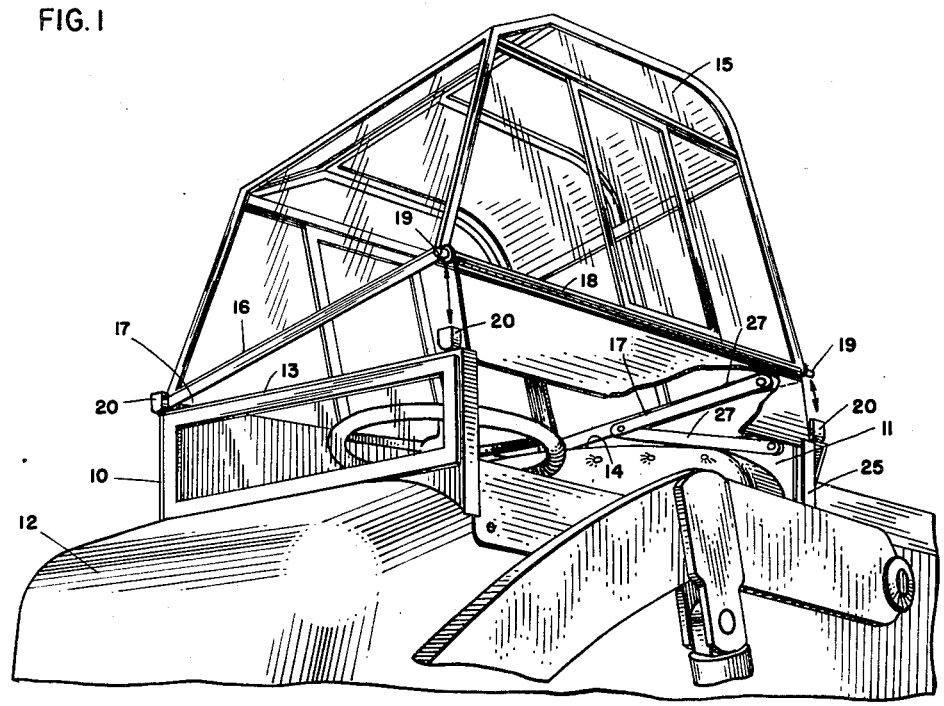
FIG. 3  FIG. 4
FIG. 2
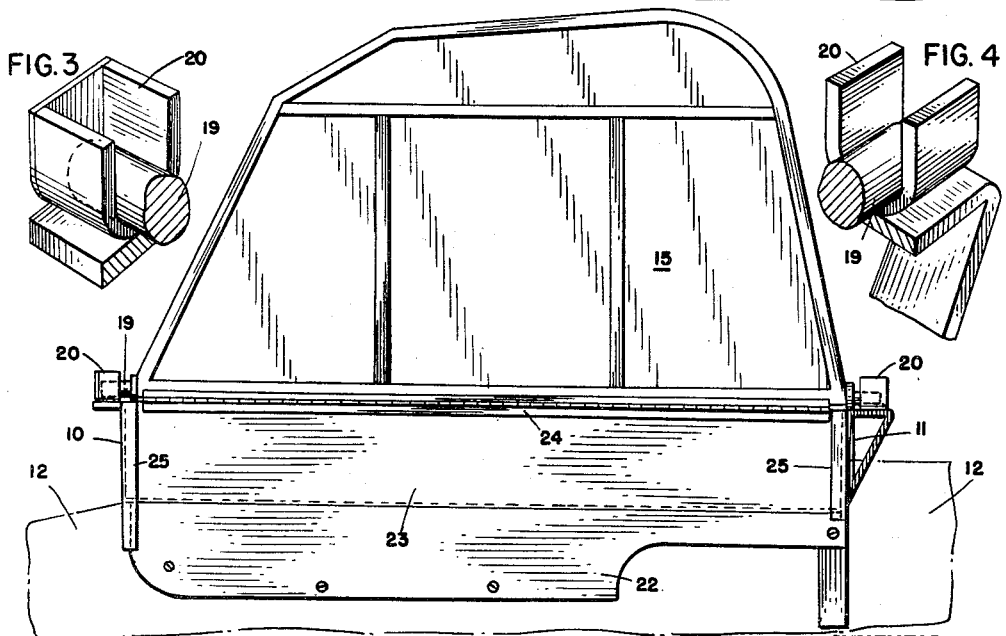
INVENTOR:
LaVERN A. CAMPBELL
BY
ATT'YS June 19, 1951  LA VERN A. CAMPBELL  2,557,339
DETACHABLE CAB
Filed June 13, 1950  2 Sheets-Sheet 2
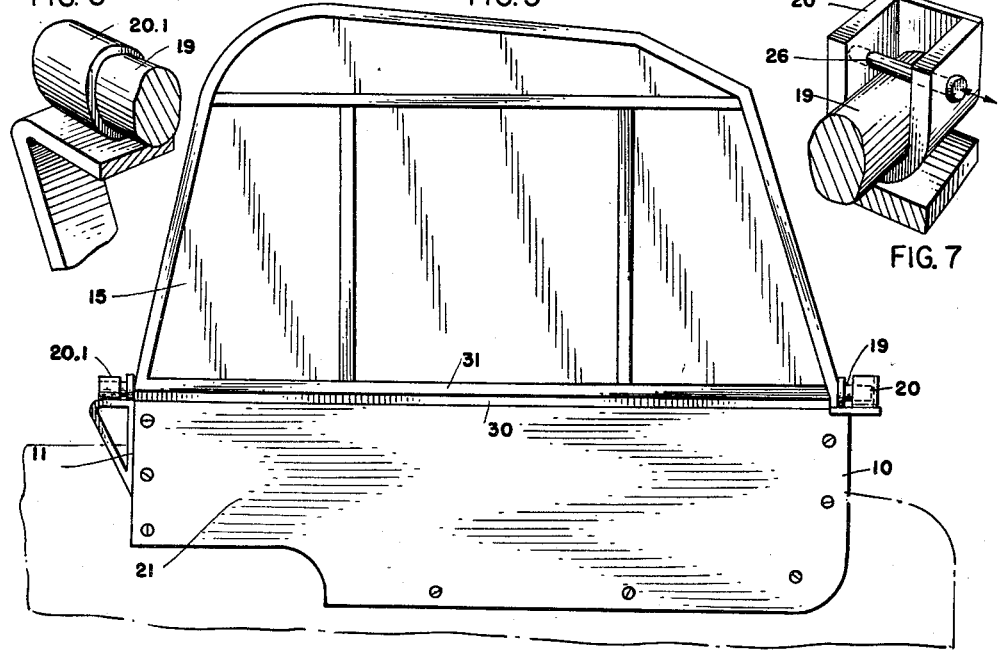
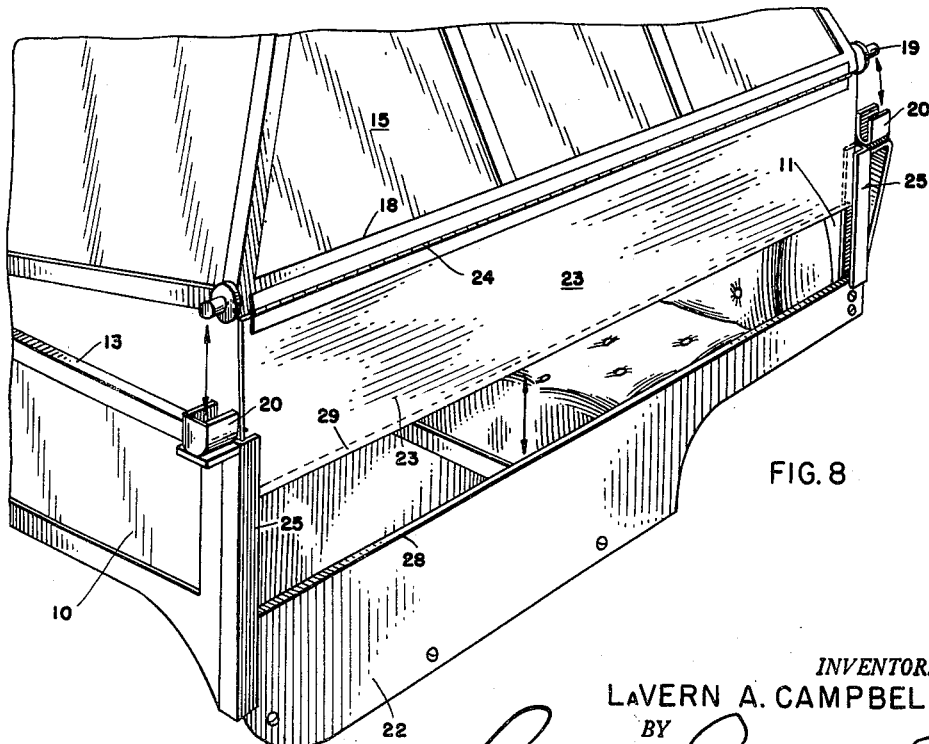
INVENTOR:
LaVERN A. CAMPBELL
BY
ATT'YS Patented June 19, 1951

2,557,339

UNITED STATES PATENT OFFICE 2,557,339

DETACHABLE CAB

La Vern A. Campbell, Grayslake, Ill.

Application June 13, 1950, Serial No. 167,863

2 Claims. (Cl. 296—28)

This invention relates to vehicle cabs especially of a type suitable for attachment to tractor vehicles for the purpose of protecting the operator from weather conditions.

The main objects of this invention are to provide an improved form of cab structure adapted for use as an accessory attachment to tractor vehicles; to provide an improved construction of the mounting means for such cabs so as to be readily adaptable for application to the various forms of tractor vehicles; to provide an improved structure whereby the main housing shell of the cab body can be readily tilted to one side for the purpose of ingress and egress of the operator; and to provide an improved and compact form of cab that occupies but minimum space and is especially adapted to have its walls mainly constructed of glass or other transparency and provide for ingress and egress without the necessity of having a large door in the side wall of the cab body.

A specific embodiment of this invention is illustrated in the accompanying drawings in which:

Figure 1 is a perspective view of the improved cab structure with fragmentary portions of the vehicle and illustrating how the cab body may be tilted to one side for ingress and egress of the operator.

Fig. 2 is an elevation of the right-hand side of the same when the cab body is in its normal position upon the vehicle.

Figs. 3 and 4 are details of the trunnion bearings that support the left side of the tiltable body of the cab.

Fig. 5 is an elevation of the cab structure as viewed from its right-hand side.

Figs. 6 and 7 are fragmentary details of the trunnion bearings that support the right-hand side of the tiltable portion of the cab body.

Fig. 8 is an enlarged fragmentary perspective view explanatory of the operation of the apron structure which closes the entrance passage when the tiltable portion of the cab is in its normal position.

In the form shown in the drawings, the improved cab comprises front and rear saddles 10 and 11 which extend across the vehicle chassis structure 12 and are fitted thereto so as to form stationary front and rear wall portions of the cab. The upper rims 13 and 14 of these saddles 10 and 11 are preferably in the same horizontal plane and serve as sills for supporting the tiltable body portion 15 of the cab.

The body portion 15 is constructed with transparent front, side and rear walls and a suitable roof mounted on a rigid skeleton frame having its bottom horizontal members in one plane, with front and rear bars 16 and 17 which rest upon the sills 13 and 14 and with side bars 18 and 19 that are extended beyond the bars 16 and 17 to form trunnions 19 that are seated in upwardly open U-shaped bearing members 20.

In the form shown, the space on the right side of the cab below the tiltable portion 15 of the cab body and between the saddles 10 and 11 and the vehicle chassis is closed by a permanently fixed wall panel 21. On the left side, the space between the saddles and the chassis frame is closed at its lower portion by a stationary wall 22 and a movable wall portion which is in the form of an apron 23 attached to the bottom bar 18 by a continuous hinge 24 so as to be swingable with respect to the tiltable body portion 15. The front and rear edges of this apron 23 are slidably secured by U-shaped channel members 25, whereby it is guided to and from its closed position.

In case the cab is tiltable only toward one side, as illustrated in the drawings, one of the trunnion bearings identified by the numeral 20.1 in Fig. 6 may be in the form of a closed cylinder—as for example the rearward one—and the corresponding front trunnion bearing 20 would then be equipped with the removable pin 26. Then upon removing the pin 26, the front end of the cab body 15 can be lifted out of engagement with the trunnion bearing 20 so that the rearward pin 19 can be pulled out from its bearing which, in such case, is loose enough to permit such tilting for the purpose of lifting the removable cab body entirely clear of its supports.

Normally the pin 26 and the circular bearing 20.1 function to lock the tiltable cab body 15 against accidental displacement during the tilting operation.

The tilting of the cab body is limited by suitable means that tie it to one of the saddles, as for instance a pair of toggle links 27 respectively connected to the tiltable cab frame and to the saddle 11 and pivotally connected to each other as illustrated in Fig. 1 so as to brace the tiltable body 15 in its extreme tilted position and when collapsed to permit it to be returned to its normal position of rest on the saddles.

The abutting edges 28 and 29 of the fixed panel 22 and apron 23 may, of course, be provided with suitable packing, not shown, to make their engagement weather-tight when the cab body is in its normal position and a similar packing, such as indicated at 30, maintains a weather-tight contact between the frame bar 31 and the fixed panel 21.

The herein-described cab is particularly advantageous for use on work-performing vehicles of the tractor type because of its simplicity, the substantial nature of its construction, its light weight and its adaptability for ready attachment to and removal from the chassis of the vehicle.

Although but one specific embodiment of this invention is herein shown and described, it will be understood that numerous details of the structure shown may be altered or omitted without departing from the spirit of the invention as defined by the following claims:

I claim:

1. A vehicle cab, comprising front and rear cab sills adapted for attachment to a chassis frame, a cab frame resting on said sills, hinge means connecting one lateral side of said cab frame to both said sills for lateral tilting of the cab frame, means on said sills having interfitting engagement with the other side of said cab frame, an apron dependingly attached to the bottom of said other side of the cab frame, and vertical guide means adjacent said front and rear sills slidably engaging the front and rear edges respectively of said apron.

2. A vehicle cab, comprising front and rear cab sills adapted for attachment to a chassis frame, a cab frame resting on said sills, hinge means connecting one lateral side of said cab frame to both said sills for lateral tilting of the cab frame, means attaching the other side of said cab frame on said saddles, a pair of opposed vertically disposed guideways defining an entry space between said saddles at said other side of the cab, and an apron movably and dependingly connected to said other side of the cab and positioned to slidingly coact with said guideways to open and close said entry space.

LA VERN A. CAMPBELL.

REFERENCES CITED

The following references are of record in the file of this patent:

UNITED STATES PATENTS

| Number | Name | Date |
| --- | --- | --- |
| 899,430 | Pack | Sept. 22, 1908 |
| 976,572 | Jeffery | Nov. 22, 1910 |
| 2,362,453 | Cosper | Nov. 14, 1944 |
| 2,479,036 | Campbell | Aug. 16, 1949 |